United States Patent [19]

Williams

[11] 4,184,823
[45] Jan. 22, 1980

[54] TIRE MOLD PRESS

[75] Inventor: Walter G. Williams, Danville, Va.

[73] Assignee: The Goodyear Tire & Rubber Company, Akron, Ohio

[21] Appl. No.: 955,074

[22] Filed: Oct. 26, 1978

[51] Int. Cl.$^2$ ............................................. B29H 5/02
[52] U.S. Cl. ...................................... 425/36; 425/33; 425/58
[58] Field of Search ...................... 425/29, 30, 33, 35, 425/36, 58

[56] References Cited

U.S. PATENT DOCUMENTS

| | | | |
|---|---|---|---|
| 2,989,779 | 6/1961 | White | 425/36 X |
| 3,029,469 | 4/1962 | Moore et al. | 425/33 |
| 3,041,667 | 7/1962 | Harris | 425/33 |
| 3,170,191 | 2/1965 | Burkhart | 425/36 |
| 3,674,067 | 7/1972 | Cooper | 425/36 X |
| 3,793,420 | 2/1974 | Fredricks et al. | 425/58 X |
| 4,012,479 | 3/1977 | Britton et al. | 425/33 X |

Primary Examiner—J. Howard Flint, Jr.
Attorney, Agent, or Firm—R. S. Washburn

[57] ABSTRACT

In a tire mold press having a steam dome defining a chamber in which steam applies heat to the exterior of a tire mold, condensate which accumulates in the top center plate is simply and effectively removed after the end of the curing cycle and before the mold is opened by a passage through the top center plate controlled by a valve opened in response to a reduction of pressure acting on the lower surface of the plate as the tire cavity is emptied. The costs and hazards of removal of condensate or of operating and maintaining siphons are avoided. The foregoing abstract is not to be taken as limiting the invention of this application, and in order to understand the full nature and extent of the technical disclosure of this application, reference must be made to the accompanying drawing and the following detailed description.

6 Claims, 3 Drawing Figures

TIRE MOLD PRESS

The present invention relates to improvements in a tire curing press of the steam-dome type and particularly to the timely and expeditious removal of condensate which during the curing operation in such press accumulates as a pool of water on the top center plate of the tire mold in the press.

Presses of the steam-dome type are well known and are obtained commercially, for example, from the McNeil Corporation of Akron, Ohio. It has long been common knowledge among persons skilled in the art that in such steam-dome type presses a pool of condensate accumulates on the upper surface of the top center plate of the tire mold in the press. Such accumulated condensate is undesirable both because of the potential hazard to personnel and to the quality of tires cured in such press. One attempt at solving this problem is described in detail in U.S. Pat. No. 3,170,191 of Feb. 23, 1965, in which a suction tube or siphon is disposed to continually withdraw condensate from the upper surface of the top center plate during the curing operation.

While the siphon and its operation as described by the patentee provided a degree of relief from the disadvantages mentioned, it has been found in operation to be less than satisfactory. The removal of condensed steam from the pool requires a costly expenditure of steam to lift condensate from the pool on the top center plate. Continuous removal by way of such siphons increases their cost in steam wasted. The siphon and its mounting arrangement are subject to a great deal of maintenance effort and expense and to a loss of productive time. Such devices must be mounted movably to accommodate opening and closing of the press and often are damaged by interference with the closing of the press. Frequent damage, replacement of siphon or its operating mechanism is expensive and results in costly loss of productive time of the press.

A principal object of the present invention is an improvement in the tire curing press of the steam-dome type by which the disadvantages referred to are substantially or completely eliminated.

The foregoing objects, as well as additional objects and advantages which will become apparent from the following description, are accomplished in accordance with the invention by the provision of a flow passage through the top plate member which passage is maintained normally closed to fluid flow while the pressure acting on the lower surface of the top plate member exceeds the pressure acting on its upper surface and by opening the passage to flow of condensate therethrough only when the pressure acting on the lower surface is less than the pressure acting on the upper surface of the top center plate so that the accumulated condensate is drained into the cavity within the tire and thence to the normal drain from the cavity.

In a further aspect, the objects of the invention are carried out by providing a passage extending through the top center plate, preferably close to or at the lowest elevation of the plate, and providing in the passage a valve means operable in response to a pressure difference acting across the valve means to remain normally closed while the pressure on the lower surface of the plate exceeds the pressure on the upper surface thereof and to open to drain condensate from the upper surface when the pressure on the lower surface is less than the pressure acting on the upper surface, preferably by a predetermined difference.

Because the valve means is open only in response to the pressure difference, condensate is permitted to accumulate on the top center plate during the curing cycle without ill effect but is caused to drain rapidly and completely into and through the cavity concurrently with the evacuation of pressure fluid in the cavity and prior to movement of the press top assembly for removal of the tire.

To acquaint persons skilled in the arts most closely related to the present invention, certain preferred embodiments thereof illustrating the best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
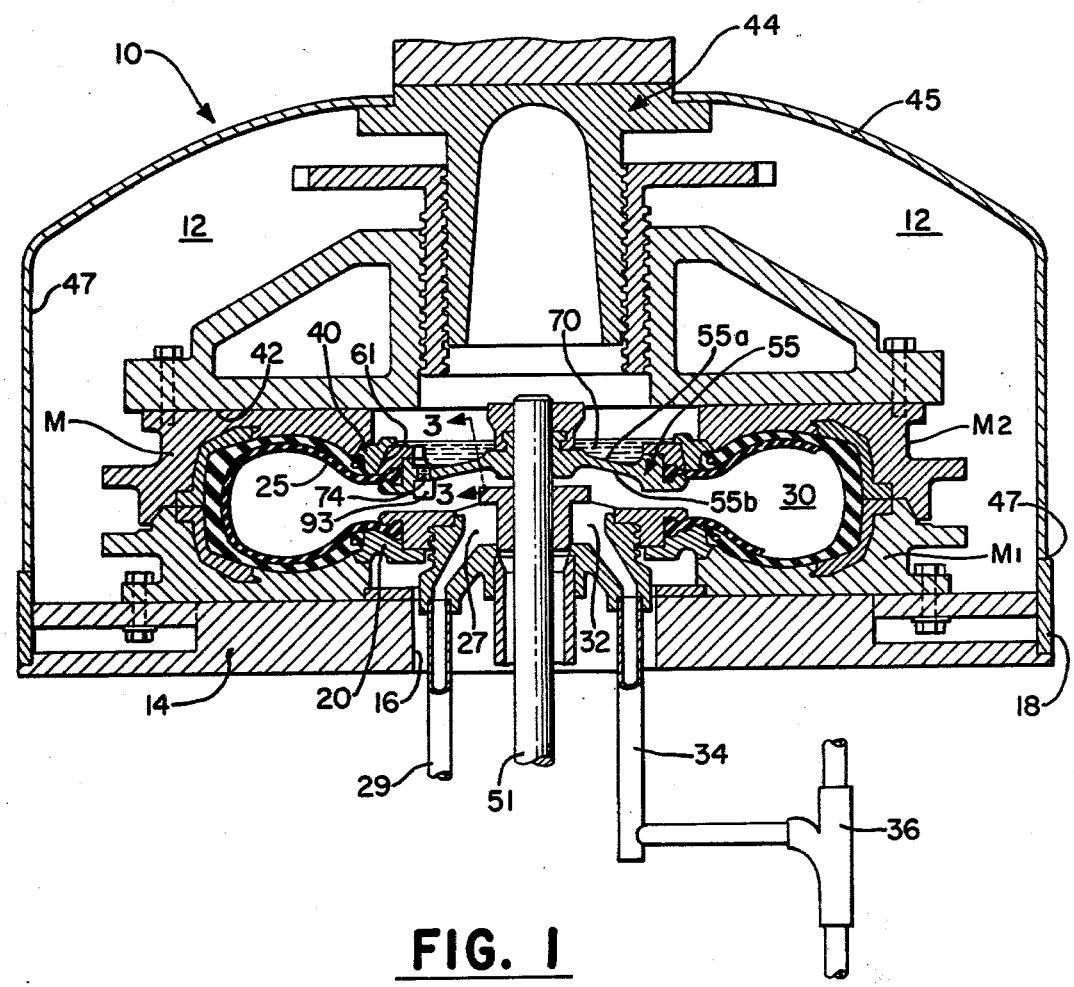
FIG. 1 is a view in cross-section elevation of a typical steam-dome press modified in accordance with the present invention.

A particular embodiment of the invention will now be described with reference to the drawings.

As is well known, a steam-dome press 10 is characterized by means providing a chamber 12 enclosing a tire mold M which chamber can be supplied with steam at a suitable pressure to act on the exterior surfaces of the tire mold M in the press.

Although such presses are well known, a brief description of the structure is appropriate here. An annular lower mold part $M_1$ is secured on a fixed lower platen 14 having a central opening 16. The platen also is provided with a peripheral wall 18. A lower center plate assembly 20 seated in the mold part $M_1$ includes a pair of clamp rings to which the lower edge of a shaping bladder 25 is attached.

The assembly 20 includes an inlet passage 27 connected to piping 29 for the admission of pressurizing fluid into the tire cavity 30 and an exhaust outlet 32 connected to drain the fluid from the tire cavity by way of a drain 34 which can be connected to an ejector 36 to accelerate the discharge of fluid from the tire cavity. The ejector also provides means for reducing the pressure in the tire cavity to or below atmospheric pressure.

The upper mold part $M_2$ includes a bead-seating ring 40 for engagement with the upper bead of the tire. The upper mold part is secured to a top platen 42 which is adjustably fixed on a movable top assembly 44 which is raised to open the mold and lowered to close to mold by conventional mechanism (not shown).

A steam dome 45 is secured to the top assembly and includes a wall 47 surrounding the top assembly to enclose the steam chamber 12. The lower edge of the wall 47 sealingly mates or engages with the wall 18 of the lower platen when the mold and chamber are closed.

Figure 2:
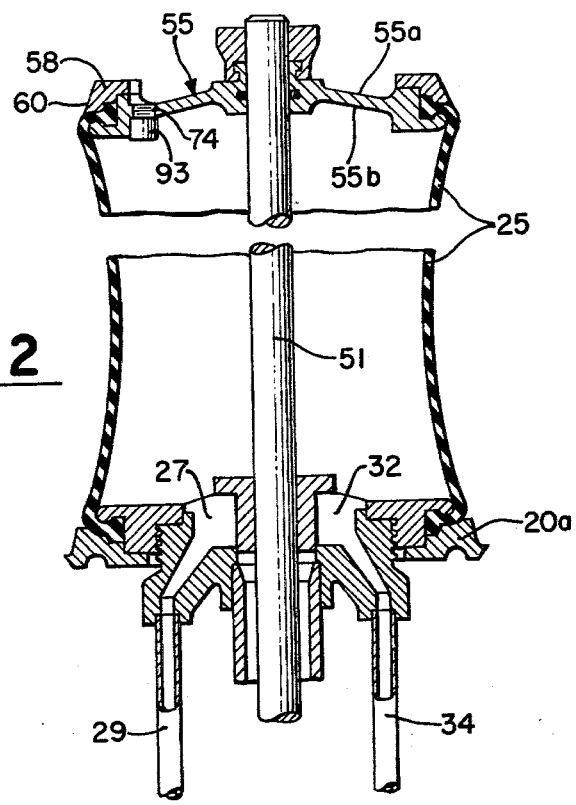
FIG. 2 is a view in cross-section elevation of a portion of the press of FIG. 1.

When the top assembly is moved upwardly to open the mold for the insertion or removal of a tire, the stem 51 of the center assembly is extended by an operating mechanism (not shown) so that the top center plate 55 is elevated to the position illustrated in FIG. 2. The lower plate assembly 20 remains fixed relative to the lower mold part M₁. The curing bladder 25 extends between the lower plate assembly 20 and the top center plate 55. The upper edge of the bladder is clamped to the top center plate by a clamp ring 58 the radially outer surface 60 of which, when the press is closed, seats conjugately on the corresponding surface 61 of the bead-seat ring 40 which is attached to the upper part M₂ of the mold. In the condition shown in FIG. 2 a tire to be cured is moved downwardly to position its lower bead on the lower bead-seat ring, so that the curing bladder can be deployed into the internal tire cavity as the operating mechanism moves the stem 51 and the top center plate 55 downward toward the position shown in FIG. 1.

It should be noted here that such steam-dome press can be used without the curing bladder for operations which are sometimes referred to as "bladderless curing" of tires.

As is best seen in FIG. 1, a pocket or sump 70 is formed on the upper surface of the top center plate 55. The depth of the sump is increased by the elevation of the clamp ring 58. On occasion, may accumulate to still greater depth on the top center plate in the annular space which is bounded by the upper bead ring and the upper mold part. Condensate can flow or be spilled from the pool to the tire, or to the tire forming surfaces of the mold, or be propelled outwardly of the press so as to injure persons nearby, if the condensate is not removed before the press is opened.

As thus far described, the apparatus and the operation thereof are well known.

According to the present invention, condensate is permitted to accumulate in the sump 70, as described, on the upper surface of the top center plate 55 during the curing operation but is removed expeditiously as the curing cycle is terminated and before the mold is opened.

To carry out the invention, the top center plate 55 is provided with a passage 76 from the upper surface 55a of the top center plate, preferably at the lowest elevation, which is therefore the greatest depth of the potential pool of condensate, to the lower surface 55b of the top center plate which surface is exposed to fluid pressure in the cavity of the tire or of the curing bladder. The passage is arranged so that, when opened, condensate can drain rapidly and directly from the pool 70 on the upper surface of the top center plate into the cavity 30 within the tire and thence by way of the outlet 32 to the drain piping 34.

In order to maintain the passage normally closed, that is, while the pressure in the bladder or cavity exceeds the pressure in the steam dome, the passage is provided with valve means now to be described.

Figure 3:
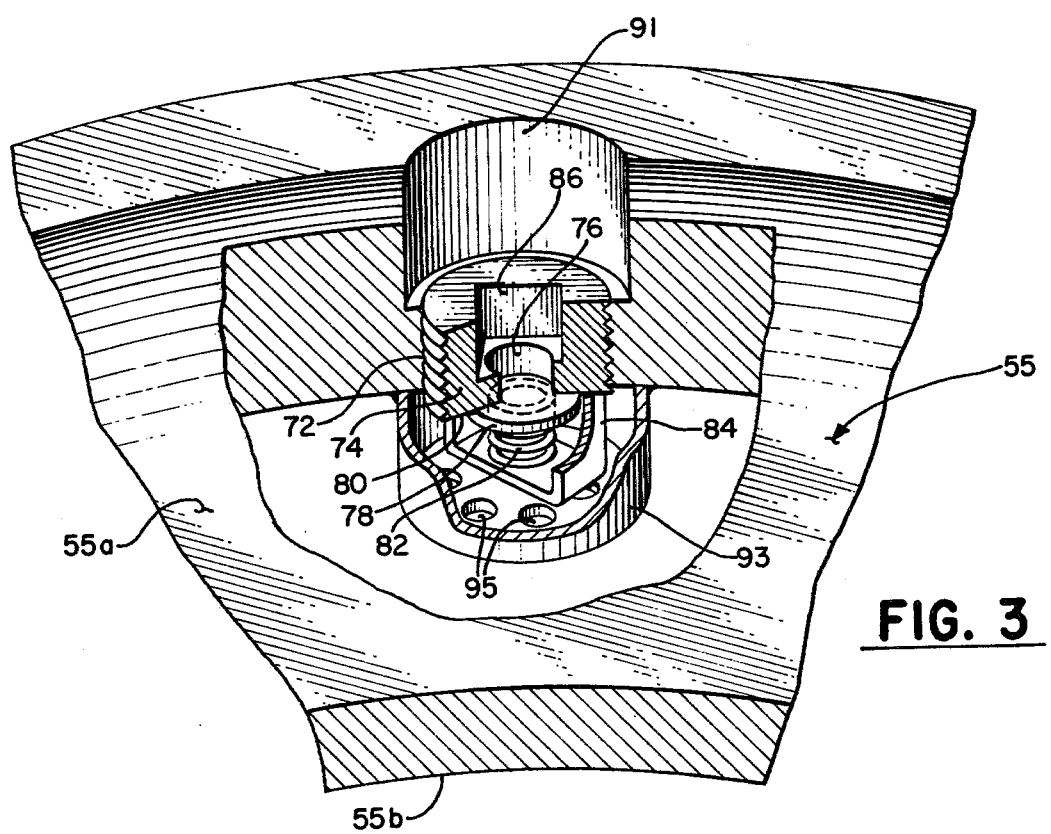
FIG. 3 is a perspective view of the top center plate of the press of FIGS. 1 and 2 oriented as indicated by the line 3—3 in FIG. 1.

In FIG. 3, a perspective view of the top plate member illustrates the top plate modified in accordance with the invention. The plate 55 is bored and tapped as at 72, that is, provided with screw threads in which a valve body 74 having corresponding threads is fixed. The valve body has an internal passage 76 through which condensate can flow. A disc 78 which is urged against the seat 80 of the valve body 74 by a spring 82 provides biasing means to maintain the valve means normally closed. The spring is supported by a yoke 84 which is made an integral part of the valve body 74. The valve means, preferably, is a preassembled unit easily fixed in the plate 55. When fixed in the plate 55, the valve means including the body, disc, seat and bias spring, require no mechanical linkage or like connection with other parts of the mold or of the press. It is thus incapable of interference with the movements of the press or of the mold.

The valve body also has a wrench socket 86 providing means for exerting, by a suitable tool, a torque sufficient to seat the valve body properly in the plate.

In order to place the passage 76 as closely as possible to the location of the maximum depth of the condensate pool, an arcuate portion 91 of the rim of the plate 55 may be removed as best seen in FIG. 3.

To protect the valve means, in particular the biasing means and the spring yoke, a cap 93 having suitably sized perforations 95 is secured to the lower surface of the plate by brazing, welding, or the like. The perforations in the protective cap may be sized so as to minimize the intrusion of undersired foreign material which might interfere with the proper seating of the disc on the valve seat.

The force exerted by the biasing means may be sufficient only to insure that the valve normally close the passage so as to prevent fluid flow outward from the cavity 30. The difference in pressure required to cause the valve means to open is predetermined by the force exerted by the spring. In the present embodiment, this predetermined difference is not less than about 5 kiloPascals (kPa). This predetermined difference can be from 5 to about 20 kPa but in no case should be more than about 30 kPa.

In its operation, the press is in accordance with the conventional practice with such steam-dome presses, it being one of the advantages of the present improvement that the condensate can be promptly and expeditiously removed without any change in or interference with the usual operations of the press.

In general, the press operation begins with placing an uncured tire with its lower bead seated on the lower bead-seat ring 20a. The curing bladder is then pressurized while the stem 51 and top center plate 55 are moved downwardly to deploy the curing bladder in the tire cavity. The mold is then closed and after the pressure in the cavity is raised to a predetermined degree, steam is admitted to the steam-dome chamber 12 at a suitable pressure, which is always less than the pressure within the tire cavity or curing bladder. After a suitable time period for curing the tire, steam to the chamber 12 is cut off and the chamber is then opened to exhaust the steam and pressure remaining therein to reduce the internal pressure in the chamber to atmospheric. Then the drain 34 is opened by suitable valve means (not shown) to drain fluid from the tire cavity or from the curing bladder. During evacuation of the curing bladder, particularly if the drain from the bladder is augmented by operation of the conventional ejector 36, the pressure then contained within the tire or curing bladder acting on the lower surface of the top center plate will diminish to a pressure difference sufficient to cause the valve means to open the passage so as to permit or force the accumulated condensate to drain through the passage into the cavity. In the present embodiment, the internal pressure in the curing bladder will be less than atmospheric pressure by from 10 to 20 kPa, thus providing a pressure difference sufficient not only to permit the condensate to drain from the upper surface of the plate but to suck condensate into the cavity.

A number of particular advantages attained by the invention will be readily apparent now to persons skilled in the art. Steam as expended in the operation of siphons such as referred to above is no longer necessary. This advantage provides a great saving in expensive fuel and steam costs. The passage and the valve means in the top center plate is far less subject to expensive downtime and maintenance effort than the devices of the prior art as represented by the aforementioned patent.

The potential hazard to personnel presented by the presence of a pool of hot condensate on the top center plate is eliminated. Tires potentially harmfully affected by the presence of water spilled in the mold cavity are substantially eliminated.

Damage to the curing bladder is much reduced by the fact that the valve means also operates to equalize the pressure acting on the bladder during press warmup. The necessary shaping of tires, particularly radial tires, as the same are inserted in the mold is improved by the better venting provided by the valve means and draining, particularly of hot water, from the curing bladder is improved.

The mold M is described herein as a two-piece mold. It should be noted that multipart molds, such as those commonly called segmented molds, can be employed in a steam-dome press, within the contemplated scope of the present invention.

What is claimed is:

1. In a tire molding and curing apparatus of the steam dome type wherein a tire is to be molded and cured, the apparatus having a tire mold including a top center plate on an upper surface of which steam-condensate can accumulate and the lower surface of which is exposed to fluid pressure for molding said tire;
   the improvement comprising means defining a flow passage for condensate from said upper surface to said lower surface;
   and valve means disposed in said passage and operable in response to a pressure difference acting across said valve means to close and remain closed while pressure on said lower surface exceeds the pressure on said upper surface and to open to drain said condensate from said upper surface to said lower surface when the pressure acting on said lower surface is less than the pressure acting on said upper surface by a predetermined difference.

2. An apparatus as claimed in claim 1 wherein said valve means comprises disc means disposed to move between a valve-closed position and a valve-open position, and valve seat means fixedly disposed in said passage means and sealingly engaging said disc means in closed position of said valve means and biasing means operable to bias said disc means toward said seat means sufficiently to insure sealing of said disc means to said seat means to close said passage while the pressure acting to open said valve means is less than the pressure acting to open said passage.

3. An apparatus as claimed in claim 1, wherein said top center plate is provided with a bore having screw threads and wherein said valve means is provided with screw threads interengaging the first-mentioned screw threads, and wherein said valve means is provided with drive means adapted to cooperate with a tool for inserting said valve means in said passage means.

4. An apparatus as claimed in claims 1, 2, or 3 wherein said drive means comprises a socket having at least one surface engageable with a conjugately formed driving tool for applying torque to insert or remove said valve means.

5. An apparatus as claimed in claims 1, or 2 further comprising screen means disposed across said passage to screen foreign matter from said valve means.

6. An apparatus as claimed in claim 5 further comprising protective cap means fixed on said plate to protect said valve means from mechanical damage.

* * * * *